United States Patent Office 3,506,398
Patented Apr. 14, 1970

3,506,398
PURIFICATION OF PHOSPHATE VALUES
WITH RESPECT TO IRON
David C. Taylor, Glendale, Mo., assignor to Monsanto
Company, St. Louis, Mo., a corporation of Delaware
No Drawing. Filed Nov. 6, 1968, Ser. No. 773,963
Int. Cl. C01b 25/18
U.S. Cl. 23—165                          3 Claims

ABSTRACT OF THE DISCLOSURE

In processes where iron impurities are precipitated from aqueous solutions containing such impurities and phosphate values by adjusting the pH of the solution to greater than 5 and maintaining the temperature of the solution above 90° C. for a period of time sufficient to effect precipitation of iron impurities, the rate of precipitation of impurities is significantly increased by conducting the precipitation in the presence of titanic ions.

BACKGROUND OF THE INVENTION

This invention relates to improved methods of precipitating iron impurities from aqueous solutions containing such impurities and phosphate values and to the use of such improved methods for recovering phosphate values purified with respect to iron from wet process phosphoric acid.

"Wet process phosphoric acid" is an impure grade of phosphoric acid produced by well-known methods of acidulating phosphate rock with strong acids, for example, hydrochloric acid or sulfuric acid. Such wet acids contain impurities, particularly iron, which contaminate phosphates recovered from the acid so as to preclude their use in many applications without some degree of purification. For example, purification of phosphates with respect to iron is generally required when the phosphate and their derivatives are intended for use in detergent compositions.

Effective methods have been developed for recovering purified phosphate values from wet process phosphoric acid. Such methods are described, for example, in U.S. patent applications Ser. No. 739,621, filed June 25, 1968; 752,148, filed Aug. 13, 1968; and 752,161, filed Aug. 13, 1968 copending herewith and having a common assignee. In such processes phosphate values are preferentially extracted from the wet process acid into a water insoluble organic amine extractant. Although the extraction results in significant purification with respect to metallic impurities some coextraction of such impurities, particularly iron, occurs. Further purification is accomplished by stripping the phosphate values and iron impurities from the amine extractant into an aqueous medium; adjusting the pH of the aqueous medium to greater than 5; and maintaining the temperature of the aqueous medium at 90° C. or higher for a period of time sufficient to effect precipitation of iron. Unless the precipitation step is conducted at very high temperatures which are obtained only at superatmospheric pressures requiring appropriate high pressure apparatus, prolonged times of precipitation are required to obtain acceptably low levels of impurities.

It is, therefore, apparent that a method of increasing the rate of iron precipitation in processes such as described above would represent a significant advance in the art.

SUMMARY OF THE INVENTION

It is an object of this invention to provide improved processes for precipitating iron impurities from aqueous solutions containing such impurities and phosphate values. More particularly, it is an object of this invention to provide methods for increasing the rate of precipitation of iron impurities from such solutions. A further object of the invention is to provide improved methods for recovering phosphate values purified with respect to iron impurities from wet process phosphoric acid.

In the process of this invention, the precipitation of iron impurities from aqueous solutions of such impurities and phosphate values by adjusting the pH of the solution of greater than 5 and maintaining the solution at a temperature of at least 90° C. is conducted in the presence of titanic ions. The invention will be better understood from the following description of the preferred embodiments.

DESCRIPTION OF THE PREFERRED EMBODIMENTS

The process of this invention can be practiced with any aqueous solution containing dissolved phosphate values and iron impurities. Solutions of this type include wet process phosphoric acid and aqueous solutions obtained in processes for recovering purified phosphate values from such acids. For example, the invention is advantageously employed for precipitating iron impurities from aqueous solutions obtained by stripping phosphate values and iron impurities from an amine extractant containing these materials.

Iron can be precipitated from such aqueous solutions in accordance with procedures described in the above referenced copending applications (739,621; 752,148; and 752,161). These references also provide a detailed description of methods of extracting phosphate values from wet process phosphoric acid by use of water-insoluble organic amine extractants. The disclosure of these applications is expressly incorporated herein by reference. In the procedures described, the pH of the aqueous solution containing dissolved iron impurities and phosphate values is adjusted to at least 5 and preferably above 6 with an alkali metal or ammonium hydroxide or carbonate. The use of sodium carbonate or sodium hydroxide is particularly preferred in view of the commercial value of the sodium phosphate products obtained. The solution is then maintained at a temperature of at least 90° C. until sufficient iron impurities have precipitated to provide the requisite degree of product purity. The subject invention resides in the unexpected discovery that the rate of precipitation of iron impurities in such procedures is significantly increased by the presence of titanic ions in solution.

It is essential that the titanium be present as titanic ions since lower oxidation states of titanium do not provide the desired increase in precipitation rates. The titanic ions can be provided by addition of a salt such as titanium tetrachloride wherein the titanium is in the required plus 4 oxidation state or by adding a salt such as titanium trichloride and an oxidizing agent such as hydrogen peroxide to oxidize the titanium ion to the required oxidation state.

In order to effectively increase the precipitation rate of iron impurities, the titanium must be present in a quantity such that the ratio of titanium to iron is at least 0.10 and preferably 0.15 or more by weight. The precipitation of iron impurities in the presence of titanic ion is carried out in the same manner as the precipitation procedure described above and in the referenced copending patent applications. When the desired quantity of iron impurities has been precipitated, the dissolved phosphate values remaining in solution are mechanically separated from the precipitate, for example, by filtration.

The practice of this invention is further illustrated by the following examples.

EXAMPLES I–IV

Wet process phosphoric acid containing 57.3% by weight phosphorus calculated as $P_2O_5$ and 1.09% iron was extracted with 3 volumes of 50% by volume solution of tricaprylyl amine in a solvent comprising a major proportion of tetramethylbenzene and minor proportions of dialkylbenzenes and trialkylbenzenes. The organic amine extractant was then stripped in a conventional multistage operation with a sufficient volume of 28% by weight aqueous sodium hydroxide solution to provide a sodium to phosphorus mole ratio of about 0.6. The aqueous phase recovered from the stripping operation had a pH of about 2 to 3 and contained 36.4% by weight phosphorus calculated as $P_2O_5$ and 0.26% by weight iron. Various amounts of titanium tetrachloride sufficient to provide titanium to iron weight ratios as shown in Table 1 below were added to aliquots of the solution. The pH of the solution was raised to about 6.8 by addition of sodium carbonate. The samples were maintained at a temperature of about 100° C. and portions of the samples were periodically filtered and analyzed for iron content. The time required to reduce the dissolved iron content to 85 parts iron per million parts $P_2O_5$ (a level arbitrarily selected as representative of a high degree of purification) is shown in Table 1.

TABLE 1

| Example | Quantity titanic ion added | Time required to reduce dissolved iron content to 85 parts iron/million parts $P_2O_5$ (min.) |
|---|---|---|
| I | None | 325 |
| II | Sufficient to provide weight ratio of Ti/Fe of 0.164. | 120 |
| III | Sufficient to provide weight ratio of Ti/Fe of 0.244. | 60 |
| IV | Sufficient to provide weight ratio of Ti/Fe of 0.270. | 60 |

It is seen from the above examples that when the precipitation is conducted in the presence of titanic ion, the time required to precipitate a major proportion of the iron impurities is substantially reduced.

What is claimed is:

1. In a process for precipitating iron impurities from an aqueous solution containing iron impurities and phosphate values by adjusting the pH of said solution to at least 5 and maintaining said solution at a temperature of at least 90° C. until a major proportion of said iron impurities have precipitated, the improvement wherein the precipitation is conducted in the presence of titanic ions, the weight ratio of titanium to iron being at least 0.10.

2. In a process for recovering phosphate values purified with respect to iron impurities from wet process phosphoric acid by extracting phosphate values and iron impurities from said wet process phosphoric acid into a water insoluble organic amine extractant; stripping said phosphate values and iron impurities from said extractant into an aqueous phase; adjusting the pH of the aqueous phase to at least 5; maintaining the temperature of said aqueous phase at at least 90° C. until a major proportion of said iron impurities have precipitated; and mechanically separating the aqueous phase containing dissolved phosphate values from the precipitated iron impurities, the improvement wherein the precipitation is conducted in the presence of titanic ions, the weight ratio of titanium to iron being at least 0.10.

3. A process according to claim 1 or 2 wherein the weight ratio of titanium to iron is at least 0.15.

References Cited

UNITED STATES PATENTS 3,361,527   1/1968   Hinkebein et al. _____ 23—165
3,367,749   2/1968   Koerner et al. _____ 23—165

OSCAR R. VERTIZ, Primary Examiner

G. A. HELLER, Assistant Examiner